(12) United States Patent
Helmut

(10) Patent No.: US 6,400,109 B1
(45) Date of Patent: Jun. 4, 2002

(54) ELECTRONIC COMMUTATED MOTOR WITH COMMUTATION SIGNAL

(75) Inventor: Hans Helmut, St. Georgen (DE)

(73) Assignee: Precision Motors Deutsche Minebea GmbH, Spaichingen (DE)

(*) Notice: Subject to any disclaimer, the term of this patent is extended or adjusted under 35 U.S.C. 154(b) by 0 days.

(21) Appl. No.: 09/614,892

(22) Filed: Jul. 12, 2000

(30) Foreign Application Priority Data

Jul. 14, 1999 (DE) .......................... 199 32 787

(51) Int. Cl.⁷ ................................ H02P 6/16
(52) U.S. Cl. ................ 318/439; 318/254; 318/721; 318/431
(58) Field of Search ................ 318/138, 254, 318/439, 720, 721, 722, 723, 724, 430, 431

(56) References Cited

U.S. PATENT DOCUMENTS

| | | | |
|---|---|---|---|
| 3,979,651 A | 9/1976 | Bringol | 318/138 |
| 4,365,187 A | * 12/1982 | McDaniel et al. | 318/254 |
| 4,912,379 A | * 3/1990 | Matsuda et al. | 318/254 |
| 5,590,235 A | 12/1996 | Rappenecker et al. | 388/803 |
| 5,712,539 A | 1/1998 | Zweighaft et al. | 318/7 |
| 5,845,045 A | 12/1998 | Jeske et al. | 388/804 |
| 5,892,339 A | 4/1999 | Park et al. | 318/254 |

FOREIGN PATENT DOCUMENTS

| | | |
|---|---|---|
| DE | 30 04 794 A1 | 8/1981 |
| DE | 195 15 944 A1 | 11/1996 |
| DE | 197 38 344 A1 | 4/1998 |

* cited by examiner

*Primary Examiner*—Bentsu Ro

(57) ABSTRACT

The present invention concerns an electronically commutated motor, in which for commutation, the output signals of a number of correspondingly arranged Hall sensors are initially evaluated to generate a multiple-figure digital code and in which, after startup of the motor, only one figure of the code is still generated by evaluation of the output signal of a single Hall sensor, while the remaining figures of the digital code are taken from a table stored in an electronic logic component as bit pattern or determined by means of a corresponding algorithm. The advantage of this expedient is that commutation no longer depends on the position-tolerance arrangement of several Hall sensors, but occurs at the best possible time.

18 Claims, 5 Drawing Sheets

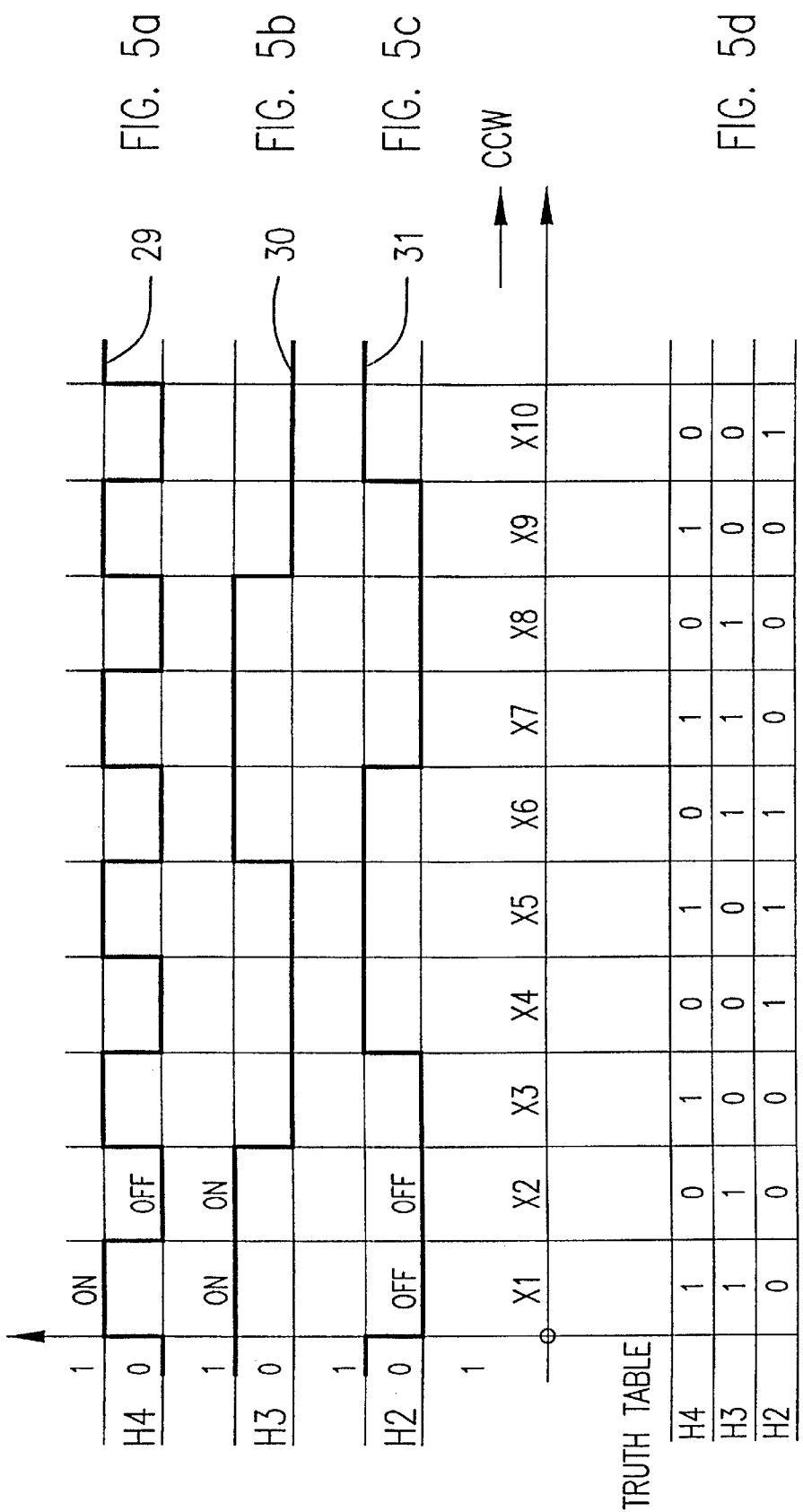

ELECTRONIC COMMUTATED MOTOR WITH COMMUTATION SIGNAL

The present invention concerns an electronically commutated motor and a method for operation of this motor according to the preamble of independent patent claims 1 and 9.

For the sake of simplicity and for better understanding, a three-phase motor excited by a permanent magnet is primarily discussed in the description, whose phases are arranged in known fashion. The present invention, however, is not restricted to a variant with three phases, but is fully applicable to variants with more than three phases and/or more than one permanent magnetic pole pair.

The drive signals for the individual phase are generated by corresponding position sensors. Hall elements or Hall ICs are preferably used according to the prior art as position sensors. The mutual rotation angle spacing or spacing of the individual Hall sensors relative to each other stated in radians is dependent on the number of magnetic pole pairs, the exact commutation times only being guaranteed when the spacing tolerance of the position sensors equals zero. Under practical conditions this requirement cannot be achieved, so that current supply of the phase windings driven by the corresponding Hall sensors occurs either too early or too late.

Such incorrect commutations result in an increase in torque ripple of the motor, which, on the one hand, leads to intensified vibrations and, on the other hand, hampers exact position or torque control.

Positioning accuracy for the Hall sensors of ±0.1 mm can only be accomplished at extremely high cost and satisfies the requirements less, the more the sensor system of the motor is miniaturized.

This problem is much more strongly pronounced in particular in motors with a larger number of pole pairs, since in this case, the mechanical angular spacing corresponding to a "electrical" rotational angle, under which the Hall sensors must be arranged, becomes increasingly smaller.

In particular, when the outside dimensions of these motors become increasingly smaller in adjustment to corresponding incorporation conditions so that the radius of the circle on which the Hall sensors are arranged also diminishes, the resulting percentage angular error resulting from this is increased at the same positioning accuracy. The smaller the motor and the larger the number of magnetic pole pairs, the more critical the position tolerances of the Hall sensors are as angle errors with reference to the commutation times of the corresponding phase windings.

The underlying task of the invention is therefore to generate commutation signals produced by Hall sensors more precisely and less subject to tolerance so that commutation is no longer dependent on the corresponding dimension-related scatter with reference to arrangement of these Hall sensors on the circuit board.

The solution to this task occurs with the technical teachings of the independent patent claims 1 and 9.

It is important according to the invention that only the output signals of a single position sensor are evaluated as signal source after startup of the motor. Startup occurs, as previously, with allowance for the tolerance-burdened output signals of at least two position sensors operating with the same timing frequency.

All additional commutation times are derived from the timing frequency of this one signal source, in which the timing frequency of this one signal source is a whole number multiple (corresponding to the number of phases) of the second frequency with which the other position sensors necessary for motor startup conforming to direction of rotation are driven. An additional Hall sensor can be provided as signal source with higher timing frequency, which is driven via an additional magnetic track with a correspondingly higher number of pole pairs. The higher timing frequency, however, can also be derived from one of the position sensors operating with lower timing frequency whose low timing frequency is prepared and multiplied accordingly by a method of signal technology appropriate for this.

The Hall sensors are arranged on a fixed circuit board, whereas the control magnetic disk rigidly connected to the rotor rotates at spacing Z1 around the common Z axis. In the case of an additional Hall sensor H4, the Hall sensors H1, H2 and H3 are arranged on an arc around Z with radius R1 by 30° mechanical (corresponding to 60° electrical), in which R1 corresponds to the average radius of the inner magnetic track 1 (two pole pairs). The additional Hall sensor H4, for example, is arranged diametrically to H2 on an arc with radius R2, in which R2 corresponds to roughly the average radius of the outer magnetic track 2 (3×2=6 magnetic pole pairs).

For example, if the Hall sensor is switched from a north pole at logic "1" and accordingly from a south pole at logic "0", a state diagram still to be explained in the later drawings is obtained during rotation of the control magnetic disk. Since one can establish immediately after the first state change by means of a truth table whether the motor is rotating in the desired direction, the Hall sensor H4 timed with the higher frequency can be switched to shortly after startup of the motor, but at the earliest after the first state change.

After switching the commutation times are exclusively stipulated by the output signal of Hall sensor H4. This state can be maintained until the motor is stopped again. However, it is important that before restartup, i.e., at the latest during shutdown, the state signals of the other Hall sensors must be reactivated so that during the next startup of the motor the actual rotor position can be clearly verified. To be able to guarantee this, the signals of the other Hall sensors H1–H3 must also be evaluated in this operating state.

It is therefore proposed according to the invention in a first approach to the solution, starting from the prior art, to provide a fourth Hall sensor H4 and a second control magnetic track in order to be able to derive the exact commutation times from the higher timing frequency of the additional Hall sensor.

It is recognized from the resulting truth table that in a three-phase motor excited by a permanent magnet only three Hall sensors are required in principle for distinct position and directional rotation recognition. In addition to Hall sensor H4 with the higher timing frequency and an additional second control magnetic track, only two additional Hall sensors, for example, H2 and H3 are therefore required instead of the initially proposed three Hall sensors H1, H2 and H3. This solution is more cost effective, since overall, according to the prior art, only three Hall sensors are again used. In this case the motor is started with H2, H3 and H4 and after starting, at the earliest after the first phase change, only H4 is evaluated.

From this point, the signals of the other Hall sensors are therefore no longer considered so that the commutation times are stipulated free of tolerance merely by the phase change of Hall sensor H4. Driving of the power transistors that switch the coil currents occurs, for example, via an upline $\mu$ processor.

It is therefore proposed according to the invention in the second approach to the solution to use the minimum number of position sensors from the prior art, but in which one of these position sensors is arranged on an arc with a different, for example, larger radius and is driven via a second magnetic track with a correspondingly higher number of pole pairs. This position sensor then delivers the higher timing frequency required for determination of the exact commutation times.

In a third approach to the solution according o the invention, it is proposed to derive the higher timing frequency required for determination of the exact commutation times by an appropriate and known method of signal technology for the timing frequency of a position sensor H1 or H2 or H3 driven with the usual low timing frequency, for example, by frequency multiplication.

The invention is now characterized by the fact that the state signals of all Hall sensors are evaluated for starting of the motor, but that after startup of the motor commutation is still only triggered by the state signals of a single Hall sensor. A new method is therefore involved, characterized by the fact that in the first phase the relatively dimension-dependent and therefore, error-burdened commutation signal for startup of the motor are obtained from a number of Hall sensors offset relative to each other in the plane and the commutation signals are still only obtained from a single Hall sensor at the earliest after the first state change of one of the Hall sensors, whereas the signals generated by the other Hall sensors remain unconsidered. It is therefore important that after startup only a single Hall sensor is responsible as timing sensor for commutation of the motor. Position-tolerance-dependent scatter of the commutation signal is therefore avoided because only the state signals of the single Hall sensor are evaluated for commutation of the motor.

In a variant of the motor with three phases, three or more sensor signals are thus evaluated, from which an at least three-figure digital code is formed. This digital code is the reference for the phase position in which the rotor is situated relative to the stator.

At the starting time an arbitrary specified code is present, for example 1-0-0. With reference to a specific stipulated or intended desired direction of rotation, however, one also knows which codes follow next after the rotor has been placed in motion.

With opposite direction of rotation of the rotor, these codes would be issued in the opposite direction.

After the actual code for the shutdown position is recognized after query and evaluation of the state signals produced by the Hall sensors, the neighboring and all subsequent codes are also known, in which, depending on the direction of rotation, one position of the code is changed with each state change and the corresponding next code is thus generated.

It is explained below that the described principles apply not only to a three-phase motor, but also to motors with more than three phases. However, the different feed possibilities of three-phase motors are initially explained:

In principle, it applies that a three-phase motor with bipolar driving requires six different states in driving the phases. A six-pulse motor is involved accordingly. The employed number of pole pairs now states after which mechanical rotor rotation angle a full electrical cycle is traversed in which every 60° electrical corresponds to 30° mechanical. Similar ratios apply in multiphase motors with more than three phases.

During commutation of a three-phase motor with two pole pairs, a sequence of six different codes is therefore required corresponding to the six different state changes pertaining to an electrical cycle (one cycle equals 360° electrical corresponding to 180° mechanical or a half rotation).

The object according to the invention of the present invention is apparent not only from the object of the individual patent claims, but also from the combination of individual patent claims.

All data and features disclosed in the documents, including the summary, especially the spatial layout depicted in the drawings, are claimed as essential to the invention if they are new separately or in combination relative to the prior art.

The invention is further explained below by means of drawings showing several variants. Additional features essential to the invention and advantages of the invention are apparent from the drawings and their description.

IN THE DRAWINGS

FIG. 1 schematically depicts a first practical example of a motor circuit of a three-phase motor with four Hall sensors;

FIGS. 5a–5d show the signals produced from the control circuit according to the FIG. 4 of the employed three Hall sensors in conjunction with the corresponding code sequence depicted in FIG. 4.

Figure 1:
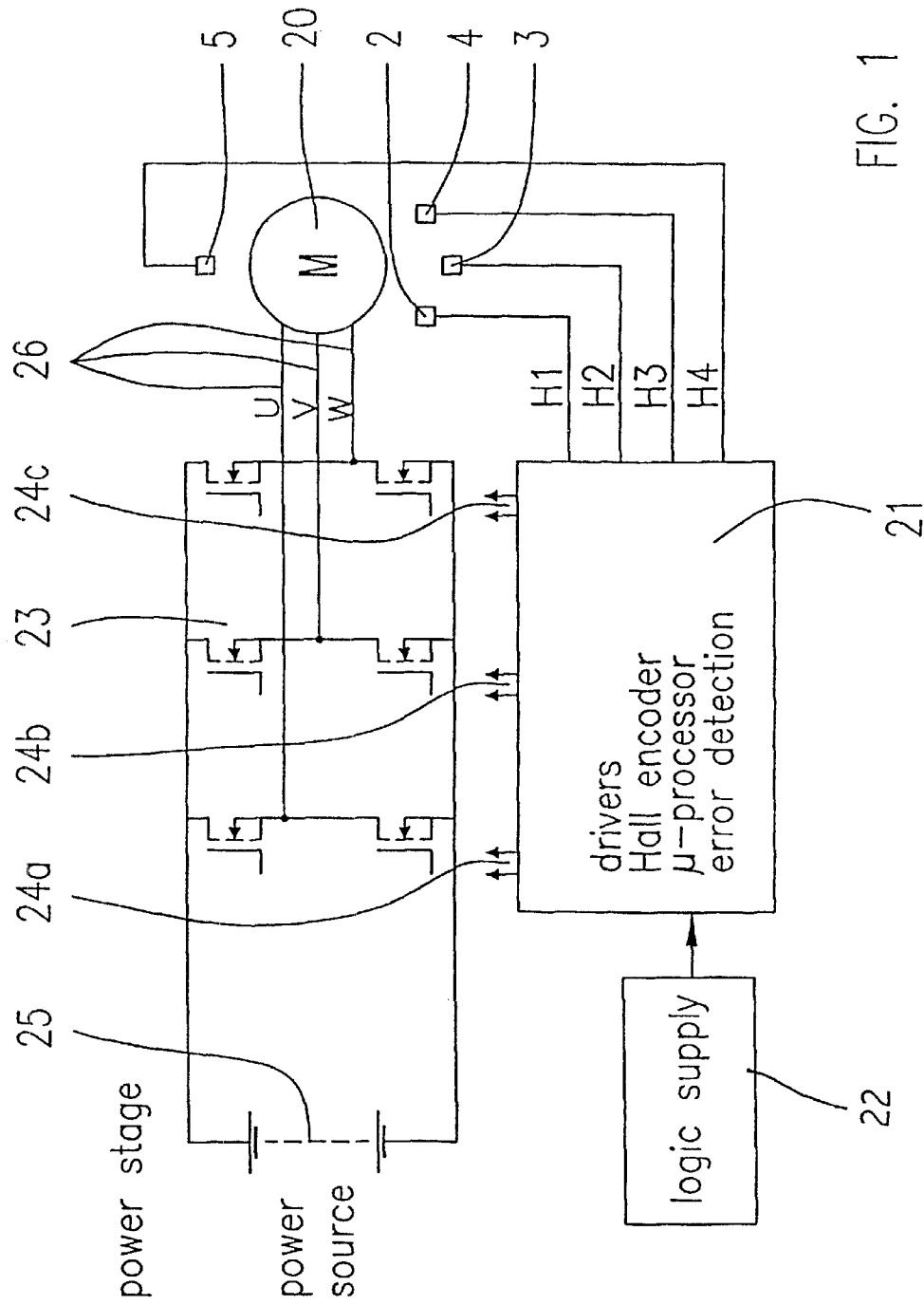

A control circuit for a three-phase motor 20 is shown in general in FIG. 1, whose phases U, V, W are fed with current via phase lines 26. The phase lines 26 are connected to a power end stage 23 in which a number of power transistors are arranged, which are driven in turn by commutation signals 24a, b, c via control lines 24. The entire end stage 23 is fed from a main power supply 25.

Generation of the commutation signals 24a, b, c occurs, for example, via a Hall encoder 21, which is supplied from a voltage source 22.

It is important that only a total of four different Hall sensors 2, 3, 4, 5 are distributed on motor 20, which are hereafter also referred with the letters H1 to H4.

The state signals coming from these Hall sensors 2–5 are converted in encoder 21 in a manner not further shown to the commutation signals 24a, b, c that drive the power transistors.

Figure 2:
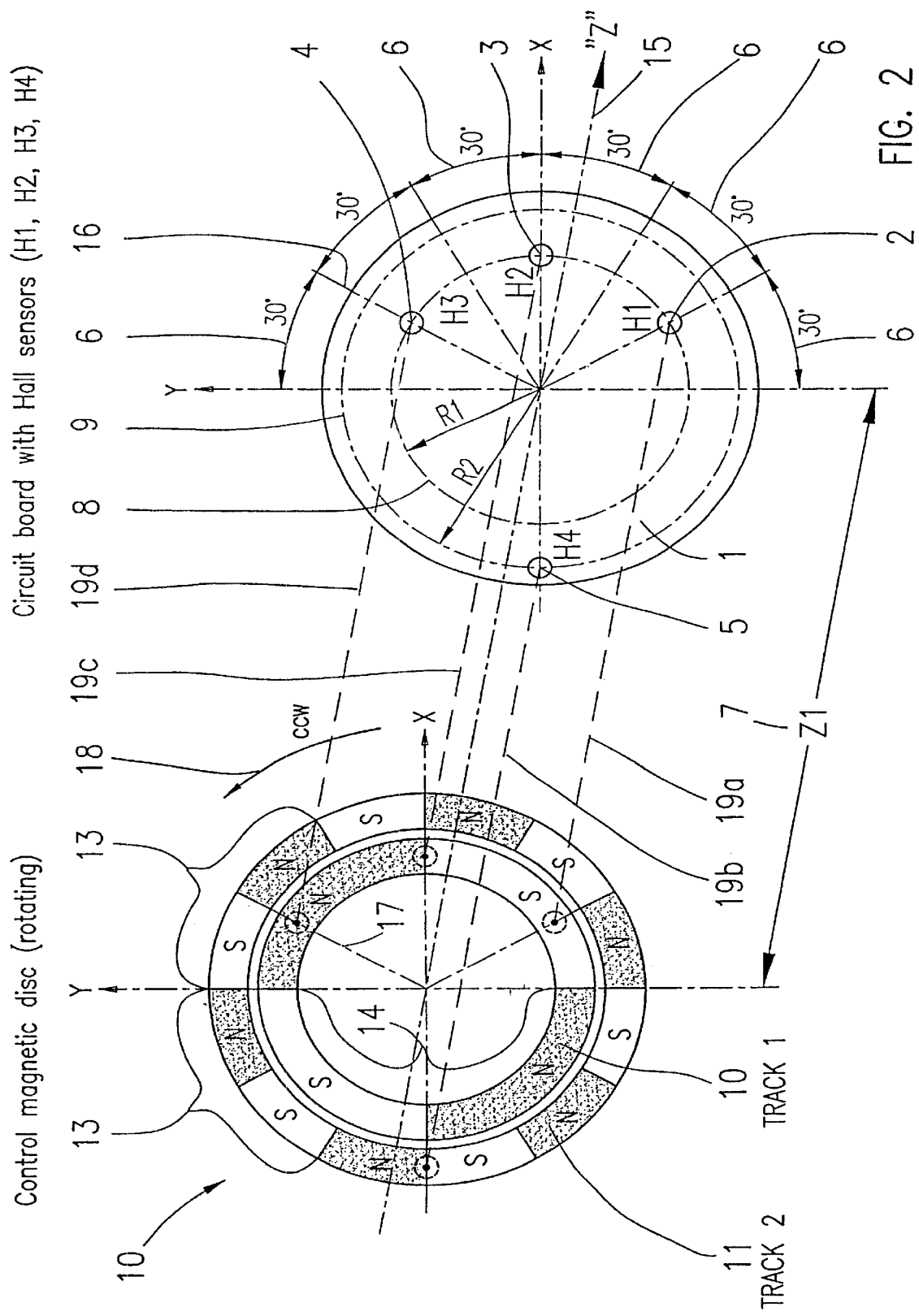
FIG. 2 shows the schmetized arrangement of Hall sensors on a stationary circuit board and their allocation to a control magnetic disk connected to rotate in unison with the rotor, whose magnetic pole pairs drive the Hall sensors.

FIG. 2 shows in a perspective view as an example for the numerous configuration possibilities, by means of a schematized practical example, the effect principle according to which the Hall sensors 2–5 arranged on a circuit board 1 fixed to the housing are driven by magnetic poles revolving with the rotor speed.

Owing to the circular arrangement of the control magnetic poles, the Hall sensors in the depicted example are driven by axial field components, i.e., directed parallel to the axis of rotation. However, the invention also includes solutions in which correspondingly aligned Hall sensors are driven by the radial field components, for example, the correspondingly magnetized pole wheel.

The two functional components related to each other, namely the control magnetic disk 10 rigidly connected to the rotor and the circuit board 1 equipped with Hall sensors 2–5 are arranged in or on the motor one right above the other and flush with each other relative to the common axis 15 at spacing 7, here shown strongly elongated.

Two circular concentrically arranged tracks 11 and 12 with two magnetic pole pairs 14 on the inner track 11 and six magnetic pole pairs 13 on the outer track 12 are situated on the control magnetic disk 10 made of magnetic material.

Which of the Hall sensors is driven by which of the tracks and which magnetic pole determines the corresponding switching state of the corresponding Hall sensor in the depicted group is supposed to be indicated via the secondary or projection lines 19 parallel to axis 15. Rotor and disk 10 are supposed to rotate in the direction of arrow 18.

The Hall sensors 2 to 4 are arranged on an inner circular arc 8 with a mutual angular spacing of 60°, while Hall sensor 5, on the other hand, is an outer circular arc 9 diametrically opposite Hall sensor 3. The angle sections 6, 6' of 30° each corresponding to the pole length on the outer track 12 simultaneously mark the corresponding pole transitions.

The depicted arrangement of Hall sensors on the circuit board, just like the arrangement and division of the magnetic tracts on the control disk, are examples and only one of the numerous possible configurations.

The switching states of the individual Hall sensors are shown in FIGS. 3a–3e with the corresponding code, FIGS. 3a–3d showing the time trend of the output signals 29–32 pertaining to Hall sensors H1–H4, which are obtained when the control disk 10, as indicated in FIG. 2, rotates further in the direction of arrow 18.

Figure 3:
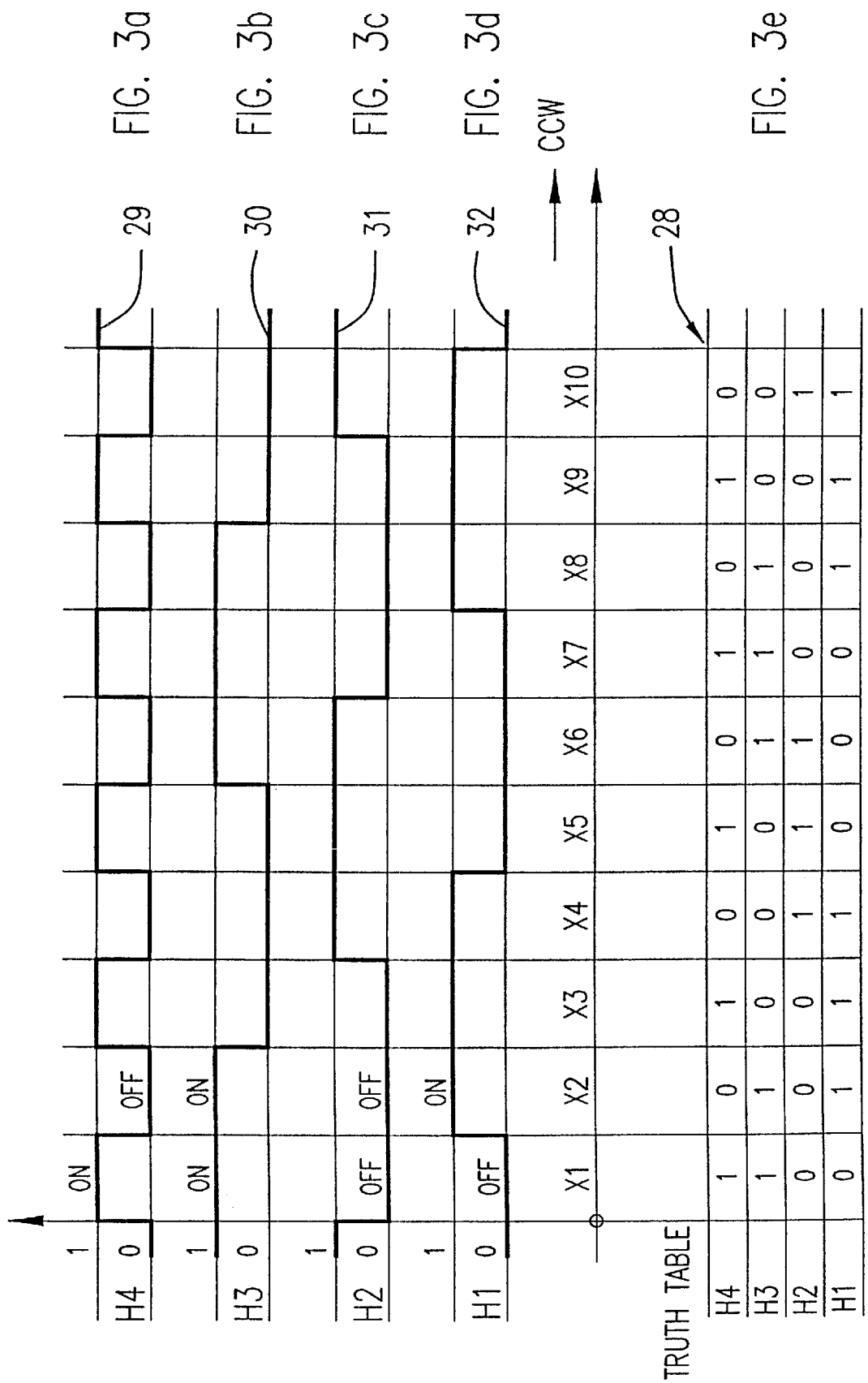
FIGS. 3a–3e show the signals of the individual Hall sensors in the code table derived from them.

A sequence of six different state combinations overall is allocated to one complete electrical cycle X1–X6, from which the four-place digital code sequence shown in FIG. 3e is obtained.

Owing to the fact that the Hall sensor H4 arranged on the radially outer arc is driven by the outer track 12 with a triple number of magnetic pole pairs 13, in comparison with inner track 12, which drives the Hall sensors H1–H3 arranged on the inner arc, it is apparent that the output signal of H4 has triple the switching frequency in comparison with the switching frequency of the output signals 30–32 pertaining to Hall sensors H1–H3.

With the different states of the individual output signals 29–32 we obtain the four-figure digital code sequence shown in code table 28, in which, for example, in state region X1 the signals 29, 30 of Hall sensors H3 and H4 are "On", whereas signals 31, 32 of Hall sensors H1 and H2 are "Off", which is shown by the numbers 1 and 0 in region X1 of the code table of FIG. 3e.

With reference to the state regions X1 to X6, the code table is therefore traversed with six different states, in which the individual states differ from each other in the Hall encoder and the corresponding commutation signals 24a, b, c are then generated.

It is unessential according to the idea of the invention that the outer Hall sensor 4 lies on the outer arc 9 with the greater radius R2. It could also be prescribed in reverse that the Hall sensors H1–H3 lie on the outer arc 9 and Hall sensor H4 on the inner arc 8. It is only important that one Hall sensor, in this case H4, be controlled by the triple number of pole pairs of the control magnetic disk in comparison with the other Hall sensors H1–H3.

For implementation of the idea of the invention, it therefore does not necessarily matter that the outer track 12 has six pole pairs.

In motors with more than three phases, other pole pair ratios of magnetic pole pairs 13, 14 on the inner track 11 can also be used in comparison with those on outer track 12.

It only applies that the magnetic poles on one of the two tracks, for example, the outer track 12, form a whole number multiple of the number of magnetic poles on the other track, for example, the inner track 11.

Figure 4:
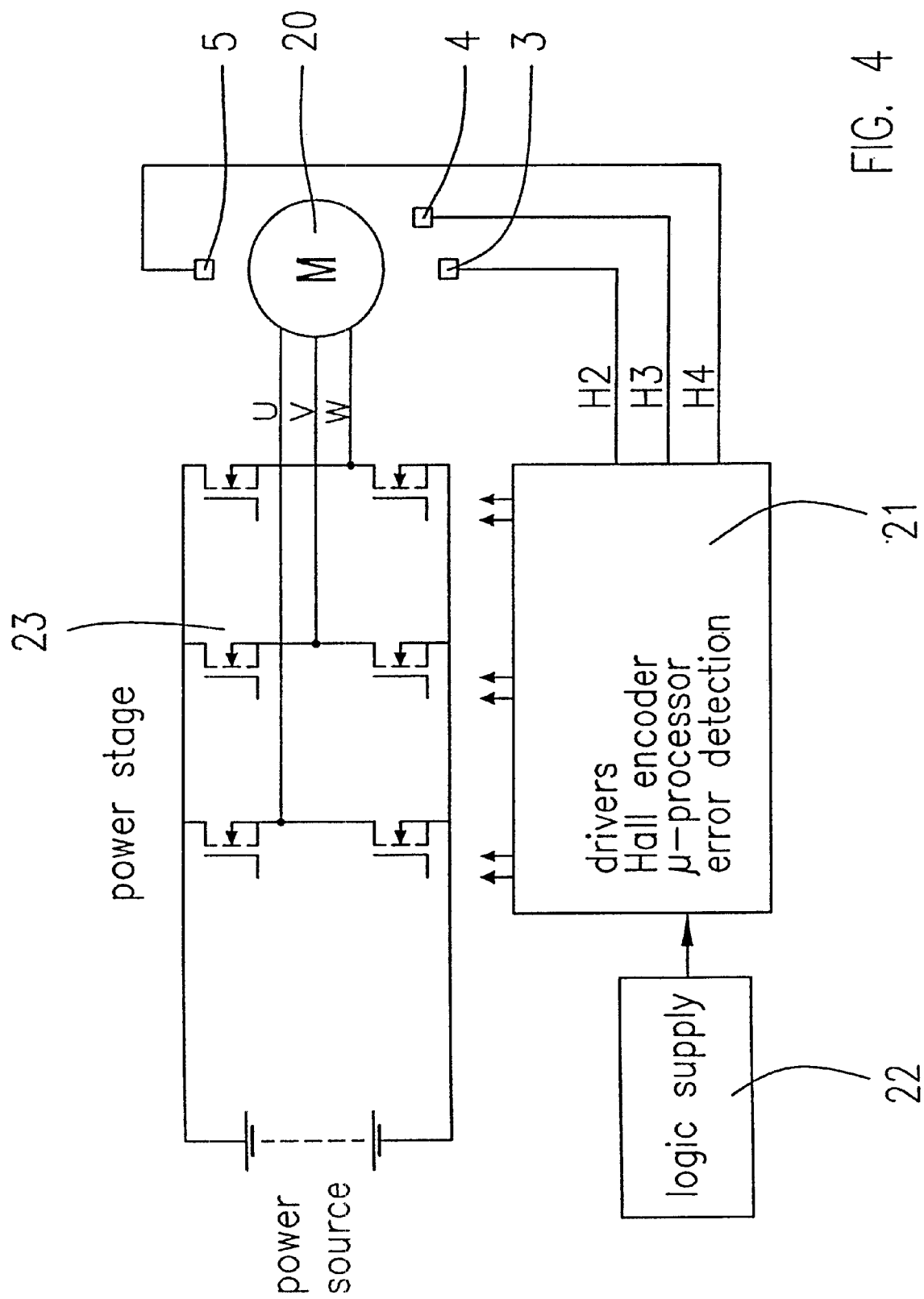
FIG. 4 shows a variant modified relative to FIG. 1 of a motor circuit using three Hall sensors.

A modified variant with a total of three Hall sensors H1–H4 is shown in FIG. 4 in comparison with FIG. 1. With reference to FIGS. 5a–5d, it is demonstrated that the idea of the invention is also implemented with this reduced number of Hall sensors (H2–H4).

The code table in FIG. 5d shows that, in comparison with code table 28 according to FIG. 3e, with respect to states X1–X6, six different states are also produced. This means the same function can also be implemented with a total of three Hall sensors.

It is therefore demonstrated that both three and four Hall sensors can be used in a three-phase motor according to the invention.

LEGEND

1. Circuit board
2. Hall sensor (H1)
3. Hall sensor (H2)
4. Hall sensor (H3)
5. Hall sensor (4)
6. Angle spacing (30°)
7. Mechanical spacing (Z1)
8. Inner arc (R1)
9. Outer arc (R2)
10. Control magnetic disk
11. Inner track
12. Outertrack
13. Magnetic pole pair (outer)
14. Magnetic pole pair (inner)
15. Z-axis
16. Angle axis (stationary)
17. Rotating angle axis
18. Arrow direction
19. Projection line
20. Motor
21. Hall encoder
22. Voltage supply
23. Power end stage
24. Control line 24a, b, c commutation signals
25. Main power supply
26. Phase line
27. Pulse on
28. Code table
29. Signal
30. Signal
31. Signal
32. Signal

What is claimed is:

1. An electronically commutated motor, in which
   the output signals of a number of correspondingly arranged Hall sensors are evaluated to generate a multiple-figure digital code by means of which current supply to the corresponding phase(s) of the motor occurs with reference to commutation time and current direction,
   wherein for current supply of the corresponding phase(s) during startup of the motor, the signals of a portion of the Hall sensors are considered and evaluated, and
   wherein after startup only the signal of a single Hall sensor is still considered and evaluated.

2. An electronically commutated motor according to claim 1, wherein after startup of the motor only one figure of the multiple-figure digital code is still generated by evaluation of the output signal of a single Hall sensor and the remaining figures of the digital code are taken from a table stored in an electronic logic component as bit pattern or determined by means of a corresponding algorithm.

3. An electronically commutated motor according to claim 1, wherein the timing frequency of the single Hall sensor is derived from commutation of the phases after startup and is a whole number multiple of the timing frequency of the other Hall sensors.

4. An electronically commutated motor according to claim 1, wherein further switching of the digital code is triggered according to a table by the state change of the output signal of the single Hall sensor.

5. An electronically commutated motor according to claim 1, wherein the electronically commutated motor comprises:

a rotor; and
a control magnetic disk connected to rotate in unison with the rotor, comprising:
   a first circle of magnetic elements for operating the other Hall sensors; and
   a second circle of magnetic elements for operating the single Hall sensor, having more magnetic elements than said first circle of magnetic elements;
wherein, the single Hall sensor is capable of operating at a higher timing frequency than the other Hall sensors.

6. An electronically commutated motor according to claim 1, wherein the electronically commutated motor comprises a pole wheel, said pole wheel comprising a first number of poles, and the single Hall sensor operates at a higher timing frequency than the other Hall sensors, determined by the first number of poles.

7. An electronically commutated motor according to claim 1, comprising, a frequency multiplier capable of generating a higher timing frequency output signal from the output signal of the single Hall sensor by frequency multiplication, wherein the higher timing frequency output signal is for generating the multiple-figure digital code.

8. An electronically commutated motor according to claim 7, wherein the frequency multiplication occurs by means of electronic components or circuits that operate in analog or digital fashion.

9. A method for controlling an electronically commutated motor, in which the output signals of a number of correspondingly arranged Hall sensors are initially evaluated to generate a multiple-figure digital code, by means of which current supply of the corresponding phase(s) for startup of the motor occurs with reference to the commutation time and current direction and in which, after startup of the motor only one figure of the code is generated by evaluation of the output signal of a single Hall sensor, wherein the output signal from the single Hall sensor is at a higher timing frequency than the signals output from the other Hall sensors, whereas the remaining figures of the digital code are taken from a table stored in an electronic logic component as bit pattern or determined by means of a corresponding algorithm, wherein in a first process step,
   at least to the first state change, of a multiple-figure digital code,
   output signals of a portion of the Hall sensors, are investigated and evaluated to verify the direction of rotation of the electronically commutated motor;
that in a second process step
   it is decided in which direction the sequences of subsequent codes according to the table must be processed; and
that in the third process step,
   after the first state change of the multiple-figure digital code, only the signal of the single further used Hall sensor is still evaluated.

10. A method for controlling an electronically commutated motor according to claim 9, wherein, for generation and/or advance of the multiple-figure digital code, signal generated by the single further used Hall sensor is evaluated exclusively or in alternation.

11. A method for controlling an electronically commutated motor according to claim 9, wherein at the latest during shutdown before restartup of motor, the signals of all available Hall sensors are evaluated.

12. A method for controlling an electronically commutated motor according to claim 9, wherein a total of four Hall sensors are used in a three-phase motor.

13. A method for controlling an electronically commutated motor according to claim 9, wherein a total of three Hall sensors are used in a three-phase motor.

14. An electronically commutated motor, comprising:

a rotor;
a plurality of phases;
a plurality of Hall sensors, corresponding to said plurality of phases capable of creating a plurality of output signals corresponding to rotation of said rotor;
a current supply for supplying current to said plurality of phases responsive to a multiple figure digital code; and
a digital code generator capable of evaluating a portion of said output signals from a portion of said plurality of Hall sensors to generate said multiple-figure digital code;
wherein, during startup of said electronically commutated motor,
said digital code generator is capable of evaluating said portion of output signals of said portion of Hall sensors to generate said multiple-figure digital code by means of which current supply to the corresponding phase(s) of the motor is controlled, and
after startup, evaluating only an output signal of a single Hall sensor to generate said multiple-figure digital code.

15. An electronically commutated motor control apparatus, comprising:

a plurality of sensors, corresponding to the phases of a motor to be controlled capable of creating a plurality of output signals;
a current controller for controlling current to the phases of said motor responsive to a control signal;

a control signal generator, for evaluating at least one of said output signals to generate said control signal, wherein during startup of said motor, said control signal generator is capable of evaluating a plurality of said output signals to produce said control signal, and wherein after startup, said control signal generator is capable of generating said control signal by evaluating only one of said output signals.

16. The electronically commutated motor control apparatus of claim 15, wherein said sensors are Hall sensors.

17. The electronically commutated motor control apparatus of claim 15, wherein said control signal is a multi-figure digital code.

18. The electronically commutated motor control apparatus of claim 15, further comprising a current supply for supplying current to the phases of said motor, responsive to said current controller.

* * * * *